United States Patent
Pritchard et al.

(10) Patent No.: US 10,302,186 B2
(45) Date of Patent: May 28, 2019

(54) TRANSFER CASE WITH OIL DISTRIBUTION

(71) Applicant: BorgWarner Inc., Auburn Hills, MI (US)

(72) Inventors: Larry Pritchard, Macomb, MI (US); Christopher Sullivan, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/639,546

(22) Filed: Jun. 30, 2017

(65) Prior Publication Data

US 2018/0010682 A1 Jan. 11, 2018

Related U.S. Application Data

(60) Provisional application No. 62/359,346, filed on Jul. 7, 2016.

(51) Int. Cl.

| | |
|---|---|
| *B60K 17/06* | (2006.01) |
| *B60K 17/02* | (2006.01) |
| *F16H 57/04* | (2010.01) |
| *B60K 17/344* | (2006.01) |
| *F16D 13/52* | (2006.01) |

(Continued)

(52) U.S. Cl.
CPC ......... *F16H 57/0435* (2013.01); *B60K 17/02* (2013.01); *B60K 17/06* (2013.01); *B60K 17/344* (2013.01); *B60K 17/352* (2013.01); *B60K 17/3505* (2013.01); *F16D 13/52* (2013.01); *F16H 57/043* (2013.01); *F16H 57/0446* (2013.01); *F16H 57/0473* (2013.01)

(58) Field of Classification Search
CPC .... F16D 2048/029; F16D 13/72; F16D 13/74; F16H 57/0473; F16H 57/0435
See application file for complete search history.

(56) References Cited

U.S. PATENT DOCUMENTS

| | | | | |
|---|---|---|---|---|
| 4,134,483 A | * | 1/1979 | Horsch | F16D 25/123 188/264 E |
| 6,499,578 B1 | * | 12/2002 | Kundermann | F16D 21/06 192/113.34 |

(Continued)

*Primary Examiner* — William Kelleher
*Assistant Examiner* — Gregory T Prather
(74) *Attorney, Agent, or Firm* — Young Basile Hanlon & MacFarlane, P.C.

(57) ABSTRACT

A transfer case comprises a primary output shaft, a secondary output shaft, a clutch, and a plurality of valves. The primary output shaft includes a hub rotationally coupled thereto. The clutch selectively couples the primary output shaft to the secondary output shaft to transfer torque therebetween. The clutch includes a housing, interleaved plates, and an apply plate. The housing is rotationally coupled to the secondary output shaft. The interleaved plates alternate between a first subset of the interleaved plates rotationally coupled to the hub and a second subset of the interleaved plates rotationally coupled to the housing. The apply plate compresses the interleaved plates for transferring torque between the hub and the housing. The valves selectively release oil supplied through the primary output shaft into the housing. Each valve includes a bore formed in the hub and a valve rod movable by the apply plate to open the valve.

18 Claims, 6 Drawing Sheets

(51) Int. Cl.
*B60K 17/35* (2006.01)
*F16H 48/30* (2012.01)

(56) References Cited

U.S. PATENT DOCUMENTS

| | | | | |
|---|---|---|---|---|
| 6,523,657 | B1* | 2/2003 | Kundermann | F16D 21/06 192/107 M |
| 6,840,363 | B2* | 1/2005 | Braford, Jr. | F16D 13/52 192/106 F |
| 2004/0159520 | A1* | 8/2004 | Anwar | F16D 25/123 192/70.12 |
| 2004/0159523 | A1* | 8/2004 | Duan | F16D 25/123 192/70.12 |
| 2013/0277167 | A1* | 10/2013 | Takai | F16D 25/06 192/85.17 |
| 2014/0008172 | A1* | 1/2014 | Lundstrom | F16D 48/02 192/70.12 |
| 2015/0001024 | A1* | 1/2015 | Maurer | F16D 48/02 192/48.601 |
| 2015/0057125 | A1* | 2/2015 | Pump | F16H 48/08 475/160 |
| 2016/0010698 | A1* | 1/2016 | Lundstrom | F16D 25/0638 251/28 |

* cited by examiner

TRANSFER CASE WITH OIL DISTRIBUTION

CROSS-REFERENCE TO RELATED APPLICATIONS

This application claims priority to and the benefit of U.S. Provisional Application No. 62/359,346, filed Jul. 7, 2016, the entire disclosure of which is incorporated by reference herein.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft. The primary output shaft is driven generally constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

Oil may be provided to the clutch, for example, to cool the clutch that engages the secondary output shaft. However, when the clutch is not engaged and the secondary output shaft is not driven, a continued supply of oil can create drag or friction (e.g., due to shearing of the oil between plates of the clutch) on the primary output shaft, which can reduce efficiency of the vehicle. It would, therefore, be advantageous to provide a transfer case in which oil is selectively provided to the clutch when needed.

SUMMARY

A transfer case comprises a primary output shaft, a secondary output shaft, a clutch, and a plurality of valves. The primary output shaft includes a hub rotationally coupled thereto. The clutch is configured to selectively couple the primary output shaft to the secondary output shaft to transfer torque therebetween. The clutch includes a housing, a plurality of interleaved plates, and an apply plate. The housing is rotationally coupled to the secondary output shaft. The plurality of interleaved plates alternate between a first subset of the interleaved plates that are rotationally coupled to the hub, and a second subset of the interleaved plates that are rotationally coupled to the housing. The apply plate is configured to compress the plurality of interleaved plates for transferring torque between the hub and the housing. The plurality of valves are configured to selectively release oil supplied through the primary output shaft into the housing with each valve having a bore formed in the hub and a valve rod movable by the apply plate to open the valve.

Each valve may be a spool valve, for example, with the bore extending parallel with an axis of the primary output shaft. Each valve rod may be movable in an axial direction parallel with an axis of the primary output shaft to open the valve for oil to flow through the valve in a radial direction. Each bore may also include a plurality of inlets in an inner periphery of the hub and a plurality of outlets in an outer periphery of the hub, each inlet being aligned with one of the outlets. Each valve rod includes a plurality of grooves each of which is movable into simultaneous alignment with one of the inlets and one of the outlets to open the valve.

In an implementation, a torque transfer device includes a first shaft, a second shaft, and a clutch for selectively coupling the first shaft and the second shaft to transfer torque therebetween. The clutch includes a hub, a housing, a plurality of interleaved plates, an apply plate, and valves. The hub is rotationally fixed around the first shaft. The housing is rotationally coupled to the second shaft. The plurality of interleaved plates are alternatingly rotationally coupled to the hub and to the housing. The apply plate is configured to compress the plurality of interleaved plates for transferring torque between the hub and the housing. The valves are incorporated into the hub for selectively releasing oil radially from the first shaft into the housing. The valves are opened by movement of the apply plate.

A transfer case includes a primary output shaft, a secondary output shaft, a torque transfer mechanism, a lubrication system, and an actuation system. The torque transfer mechanism selectively transfers torque between the primary output shaft and the secondary output shaft. The lubrication system lubricates the torque transfer mechanism. The actuation system simultaneously operates the torque transfer mechanism and the lubrication system.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
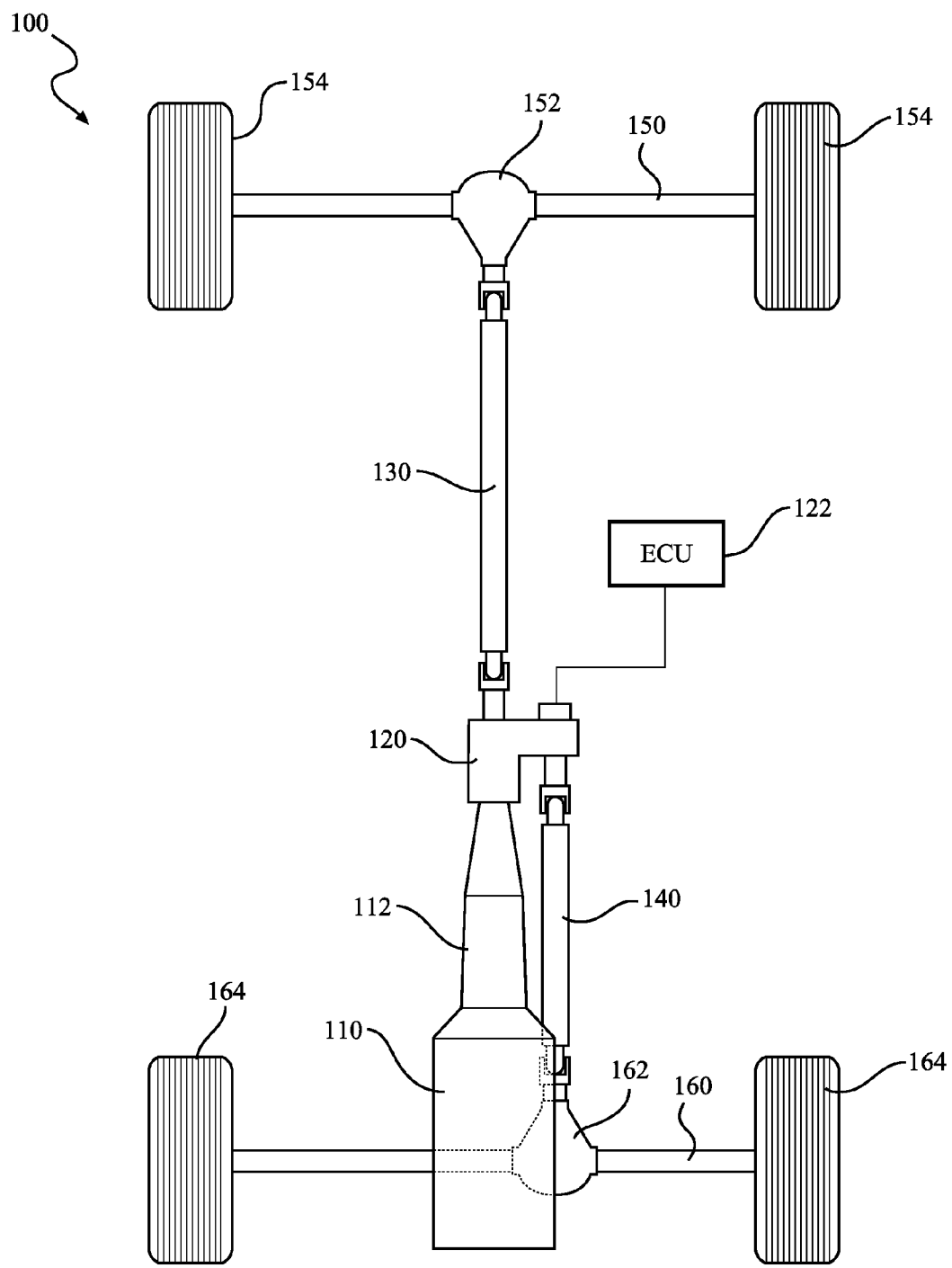
FIG. 1 is a plan view illustration showing a drivetrain that includes a transfer case.
Figure 2:
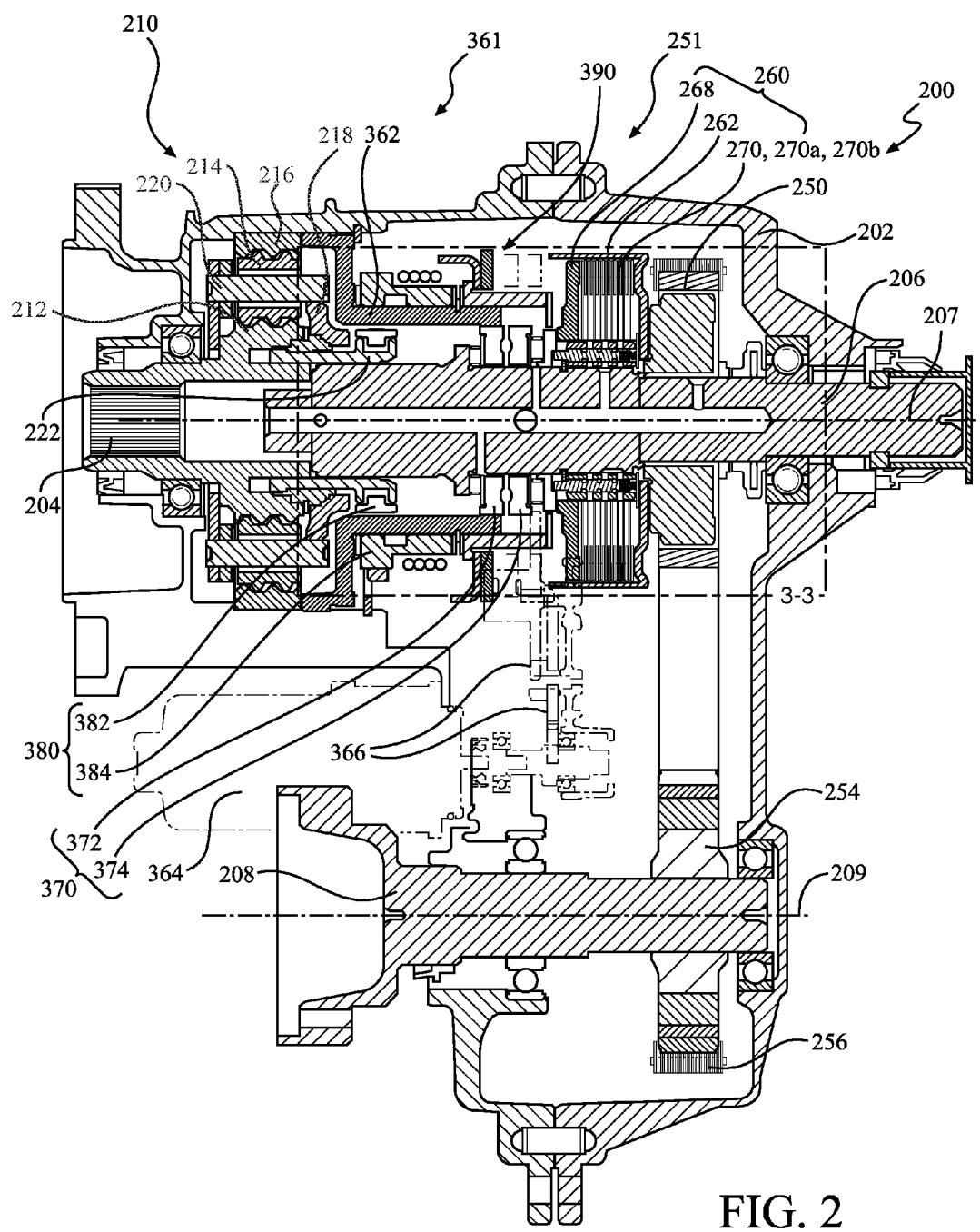
FIG. 2 is a cross-section illustration showing a transfer case according to an exemplary embodiment.
Figure 3:
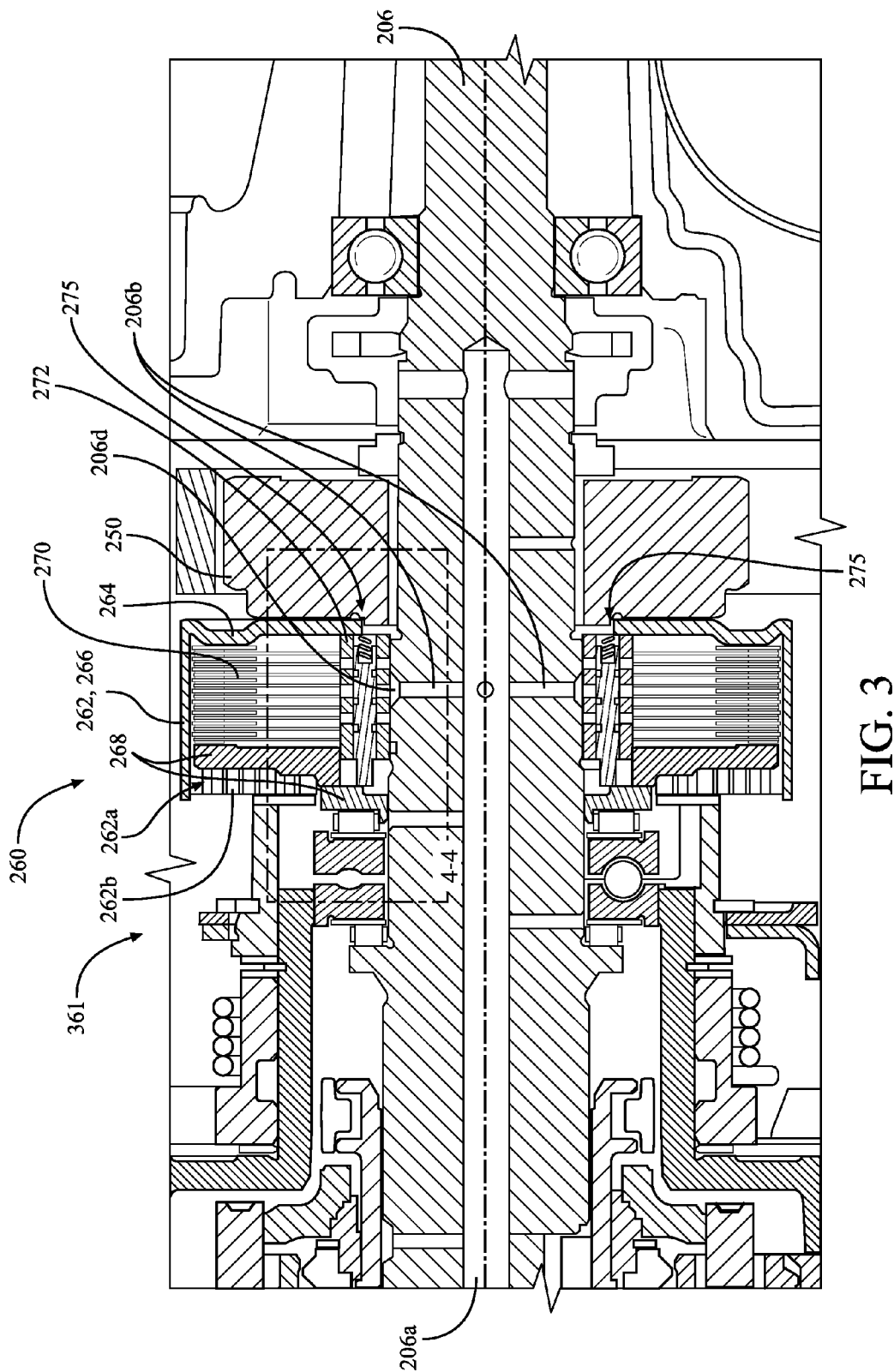
FIG. 3 is a detail view taken from box 3-3 in FIG. 2.
Figure 4:
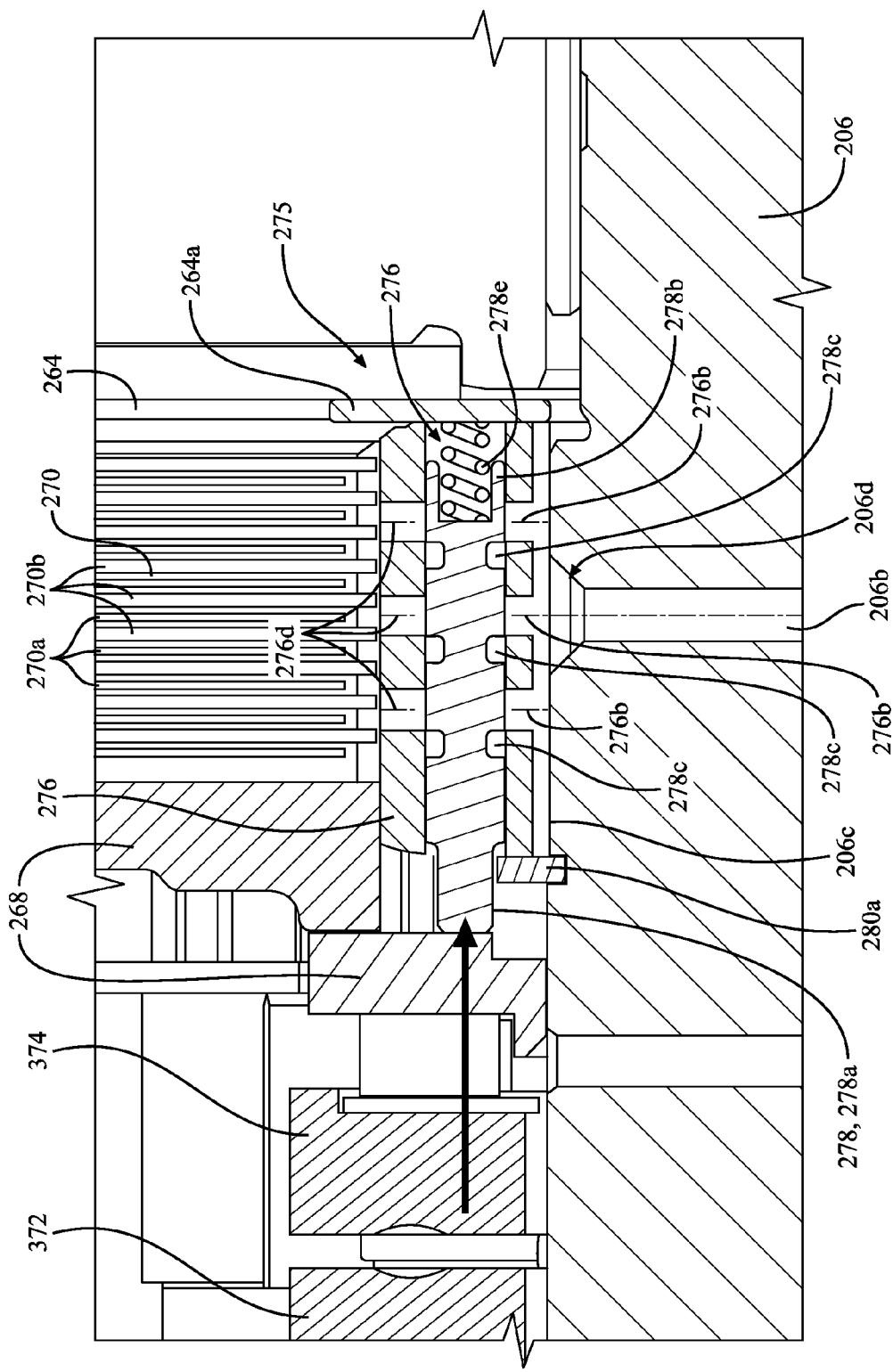
FIG. 4 is a detail view taken from box 4-4 in FIG. 3.
Figure 5:
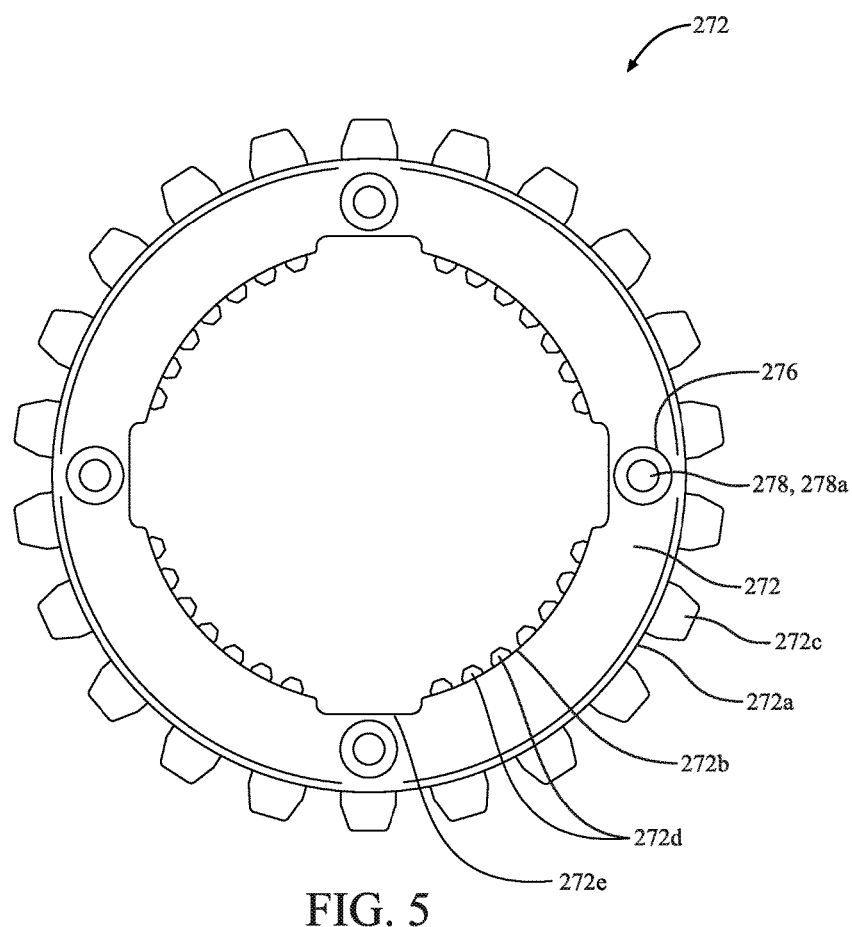
FIG. 5 is an end view of a hub of the transfer case shown in FIG. 2.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode. In other implementations, the transfer case 120 does not include components that allow a mode shift, and the transfer case 120 constantly provides driving power to both the rear driveshaft 130 and the front driveshaft 140.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

As shown in FIGS. 2-5, a transfer case 200 generally includes a gear reduction system or mechanism 210 and a secondary torque transfer system or mechanism 251. The gear reduction system 210 is configured to transfer torque selectively at different drive ratios from an input shaft 204 to a primary output shaft 206 and is operable by a reduction actuation mechanism 380. The secondary torque transfer mechanism 251 is configured to selectively transfer torque between the primary output shaft 206 (e.g., the rear output or drive shaft 130) and a secondary output shaft 208 (e.g., the front output shaft 140), and is operable by a torque transfer actuation mechanism 370. In the discussion that follows, directional terminology (e.g., front, forward, back, rearward, etc.) generally refers to an orientation in which the transfer case 200 might be installed in a vehicle (e.g., in the cross-sections shown in FIG. 2, the left side is the front of the transfer case 200, while the right side is the rear of the transfer case 200). However, such directional terminology is for reference only, as other mounting orientations of the transfer case 200 are possible. Furthermore, in some embodiments of the transfer case 200, the gear reduction system 210 may be omitted, and different actuation mechanisms may be implemented.

The transfer case 200 includes a housing 202 and rotating components, which include the input shaft 204, the primary output shaft 206, and the secondary output shaft 208 that each extend out of and rotate relative to the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position (as shown), the gear reduction hub 222 is positioned axially forward (i.e., parallel with the primary output shaft 206) to engage the input shaft 204 and the primary output shaft 206 directly, which establishes a 1:1 drive ratio and does not utilize the gear reduction mechanism 210. In a second position (not shown) of the gear reduction hub 222, the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

An actuator system 361 is configured to move the reduction hub 222 of the gear reduction mechanism 210 between its first (i.e., forward) and second (i.e., rearward) positions. The actuator system 361 includes a reduction actuator mechanism 380, which is configured as a barrel cam mechanism having a rotating barrel 384 and a fork member 382 that engages the gear reduction hub 222. The rotating barrel 384 is configured to rotate about a base 362 (e.g., inner annular or stationary member) and includes internal helical slots (not labeled) that engage ends of the fork member 382. As the rotating barrel 384 is rotated (e.g., by an electric motor 364 and/or intermediate gears or gear assemblies 366, 390), the fork member 382 is moved axially forward and rearward, so as to move the reduction hub 222 between its first and second positions. The actuator system 361 is additionally configured to operate the clutch 260 as discussed below. According to other embodiments, the gear reduction system 210 may be operated by a different type of actuator and/or an actuator that is separate from that operating the clutch 260.

The secondary torque transfer mechanism 251 is configured to transfer torque from the primary output shaft 206 to the secondary output shaft 208. As shown, the secondary torque transfer mechanism 251 is chain-driven. The secondary torque transfer mechanism 251 generally includes a first sprocket 250, a second sprocket 254, a chain 256, and a plate clutch 260. The first sprocket 250 (e.g., rotating member) is arranged around the primary output shaft 206 and is selectively rotationally coupled to the primary output shaft 206 by the plate clutch 260. The second sprocket 254 is arranged on the secondary output shaft 208 and is fixedly rotationally coupled thereto for rotation in unison, such as by splines (not shown). The first sprocket 250 and the second sprocket 254 are connected by the chain 256, such that the secondary output shaft 208 is driven by the primary output shaft 206 via the first sprocket 250, the chain 256, and the second sprocket 254 when the clutch 260 is engaged. Alternatively, the secondary torque transfer mechanism 251 may be gear-driven (e.g., having gears, instead of the sprockets and the chain, associated with each of the primary output shaft 206 and the secondary output shaft 208 that transfer torque to each other directly or with an intermediate gear). The transfer case 200 may also be considered a torque transfer device, and the various systems and mechanisms described herein (e.g., torque transfer mechanism, clutch, lubrication system, etc.) may be incorporated in other types of torque transfer devices.

The clutch 260 is configured to selectively transfer torque between the primary output shaft 206 and the first sprocket 250 and, ultimately, the secondary output shaft 208. The plate clutch 260 generally includes a housing 262 (e.g., drum), an apply plate 268 (e.g., pressure plate), and a plurality of interleaved plates 270. The apply plate 268 is configured to compress the interleaved plates 270 together to increase friction and transfer torque therebetween, which then transfer torque from the primary output shaft 206 to the housing 262.

The housing 262 forms a substantially cylindrical cavity 262a that contains the interleaved plates 270. The primary output shaft 206 also extends through the cylindrical cavity 262a and can rotate independent of the housing 262. More particularly, the housing 262 includes a base 264 (e.g., plate) that extends radially outward away from the primary output shaft 206, and also includes an annular flange 266 that is coupled to and extends axially from the base 264 to define the cylindrical cavity 262a. The base 264 is fixedly coupled to the first sprocket 250, so as to transfer torque thereto and, ultimately, to the secondary output shaft 208 when the clutch 260 is engaged.

The interleaved plates 270 are configured to transfer torque between the primary output shaft 206 and the clutch housing 262. The interleaved plates 270 alternate between being rotationally coupled to the clutch housing 262 and the primary output shaft 206. A first subset 270a of the interleaved plates 270 (e.g., a first alternating group or subset) form an axially sliding, splined connection with an inner periphery 262b of the annular flange 266 of the clutch housing 262. The inner periphery 262b of the annular flange 266 includes splines (not labeled) of corresponding dimension to splines (not labeled) on an outer periphery (not labeled) of each of the interleaved plates 270 of the first subset 270a. The splines on the inner periphery 262b of the annular flange 266 of the clutch housing 262 engage the splines of the interleaved plates 270 of the first subset 270a to transfer torque therebetween (i.e., rotationally couple), while also allowing the interleaved plates 270 to move axially therealong, as the interleaved plates 270 are compressed and decompressed.

A second subset 270b of the interleaved plates 270 (e.g., a second alternating group or subset) is rotationally coupled to the primary output shaft 206. More particularly, the second subset 270b of the interleaved plates 270 is rotationally coupled to the primary output shaft 206 by way of a hub 272. The second subset 270b of the interleaved plates 270 form an axially sliding, splined connection with the hub 272, while the hub 272 is fixedly rotationally coupled to the primary output shaft 206. The hub 272 may also be considered part of the clutch 260.

The hub 272 is an annular member having an outer periphery 272a and an inner periphery 272b. The outer periphery 272a includes a first plurality of splines 272c (e.g., outer hub splines). The second subset 270b of the interleaved plates 270 includes an inner periphery (not labeled) having a plurality of corresponding splines (e.g., inner plate splines; not labeled), which engage the outer splines 272c of the hub 272 to transfer torque therebetween and also slide axially therein (e.g., when the interleaved plates 270 are compressed and decompressed).

The inner periphery 272b of the hub 272 includes a second plurality of splines 272d (e.g., inner hub splines). The primary output shaft 206 includes a plurality of corresponding splines (e.g., outer shaft splines; not labeled), which engage the splines 272d of the hub 272 to transfer torque therebetween.

The hub 272 is fixed or held in place axially on the primary output shaft 206. More particularly, the hub 272 may be held between a lock ring 280a (e.g., snap ring or annular locking member) and a bearing member 264a that is coupled to or forms a radially inward portion of the base 264 of the clutch housing 262. The lock ring 280a may, for example, be positioned within a circumferential groove in an outer periphery 206c of the primary output shaft 206. The bearing member 264a of the clutch housing 262 engages the hub 272 in an axial direction but may rotate independent thereof with a sliding interface therebetween when the clutch 260 is not engaged (i.e., when the interleaved plates 270 are not compressed).

Figure 6A:
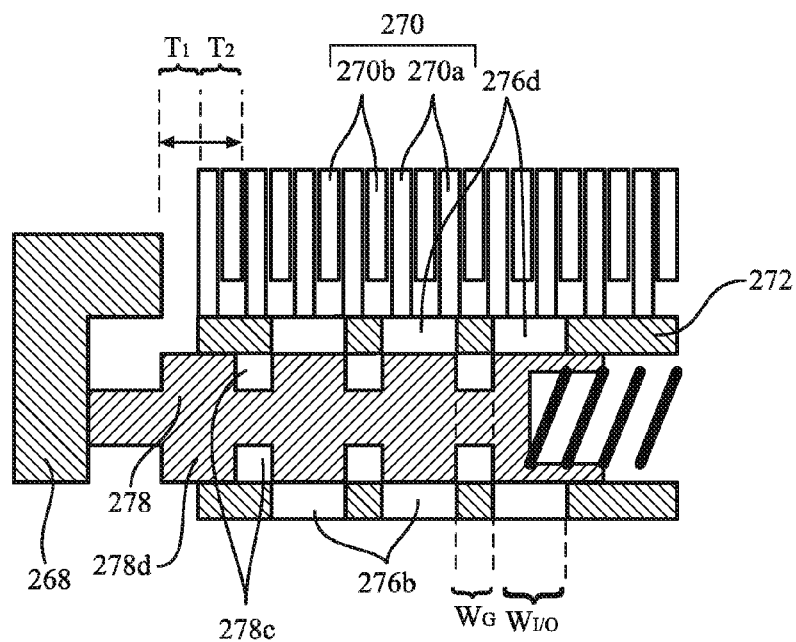
FIG. 6A is an alternative, detail cross-sectional view of the transfer case shown in FIG. 2 with a valve in a first state.
Figure 6B:
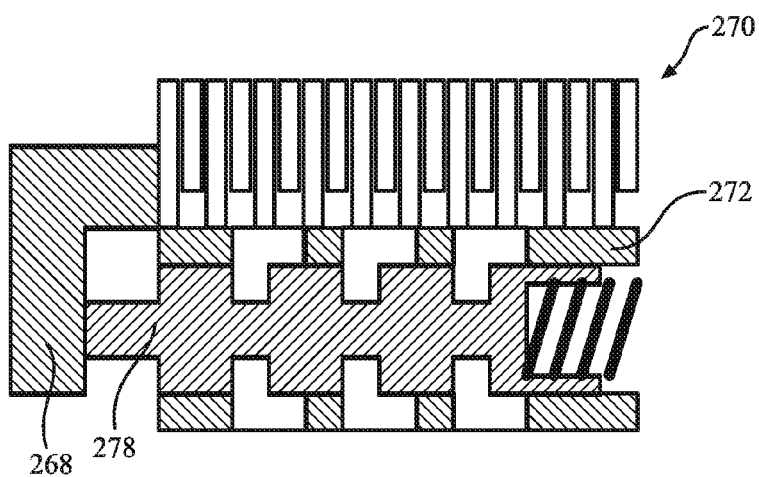
FIG. 6B is a detail cross-sectional view of the transfer case shown in FIG. 6A with the valve in a second state.
Figure 6C:
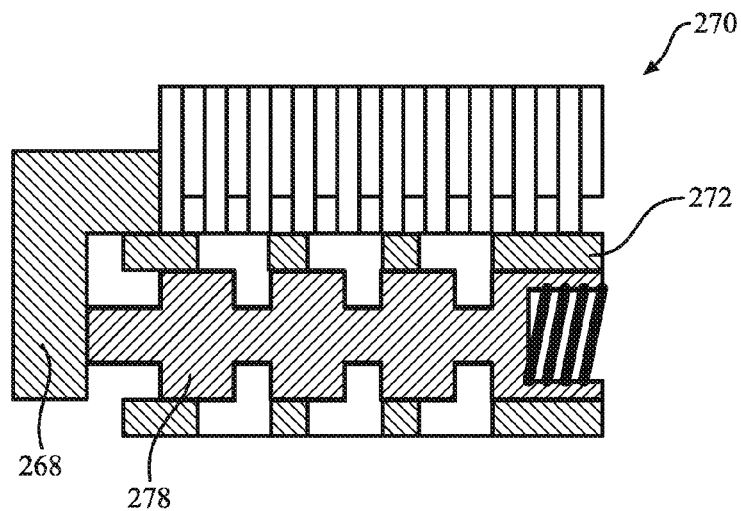
FIG. 6C is a detail cross-sectional view of the transfer case shown in FIG. 6A with the valve in a third state.

The apply plate 268 is configured to compress the interleaved plates 270 together to increase friction therebetween and, thereby, transfer torque between the primary output shaft 206, which forms a rotational coupling with the second subset of the interleaved plates 270 via the hub 272, and the clutch housing 262, which forms a rotational coupling with the first subset of the interleaved plates 270. The apply plate 268 is a multi-piece assembly, or may be a unitary member, that is moved by the actuator system 361 axially toward the clutch housing 262 to compress the interleaved plates 270 against the base 264 of the clutch housing 262. As shown in FIG. 6A, in a disengaged position (e.g., a first or forward position), the apply plate 268 is spaced apart axially forward of a forwardmost of the interleaved plates 270 (e.g., by 1-2 mm). As shown in FIG. 6C, in an engaged position (e.g., second or rearward position), the apply plate 268 is displaced axially rearward to fully compress the interleaved plates 270 together). As shown in FIG. 6B in an intermediate position, the apply plate 268 begins to engage and then gradually compresses the interleaved plates 270 together when moving between the engaged and disengaged positions.

The actuator system 361 includes a ball cam mechanism 370 having forward and rearward annular members 372, 374. As one of the annular members (e.g., the rearward annular member 374) is rotated relative to the other (e.g., by the motor 364 and intermediate gears 366 and gear assembly 390), the rearward annular member 374 displaces axially to move the apply plate 268 rearward. Bearings (not labeled) are positioned between the annular member 374 and the apply plate 268 to allow relative rotation therebetween, as the apply plate 268 may be splined to rotate with primary output shaft 206 (e.g., via the hub 272). The actuation system 361 may be configured such that the barrel cam mechanism 380 and the ball cam mechanism 370 operate at different stages of rotation of the motor 364, for example, by having dwell regions. According to other exemplary embodiments, the apply plate 268 may be operated (i.e., moved) by another type of actuation system (e.g., linear actuators) and/or may be operated by another actuation system 361 that is separate from that operating the gear reduction mechanism 210. According to still further embodiments, the clutch 260 may instead or additionally be configured with the apply plate 268 at a rearward end of the transfer case 200.

The transfer case 200 is configured to selectively provide oil to the clutch 260. For example, oil may be supplied to the clutch 260 when needed for cooling, such as when the clutch 260 is being engaged (i.e., when the interleaved plates 270 are being compressed into tighter engagement with each other), or when the clutch 260 is in an engaged state (i.e., when the interleaved plates 270 are fully compressed in tight engagement with each other). Oil is not supplied to the clutch 260, or the supply is reduced, when not needed, such as when the clutch 260 is disengaged.

The transfer case 200 includes a plurality of valves 275 that are configured to selectively supply oil to the clutch 260. The valves 275 are incorporated into the hub 272 and are configured to receive oil supplied through the primary output shaft 206 and to selectively release the oil into the clutch housing 262 of the clutch 260. More particularly, operation of the valves 275 is interdependent on actuation of the clutch 260. As described below, the valves 275 are operated by the apply plate 268 during its normal travel for engaging and compressing the interleaved plates 270. The valves 275 may also be considered part of the clutch 260. Furthermore, the valves 275 may also be considered part of a lubrication system. With the apply plate 268 being operated by the actuation system 361 and the valves 275 being operated (e.g., opened) by movement of the apply plate 268, the actuation system 361 simultaneously operates both the torque transfer mechanism 251 (e.g., the clutch 260 thereof) and the lubrication system (e.g., the valves 275 thereof).

The primary output shaft 206 includes a central conduit 206a (e.g., central or main channel) extending axially through a center thereof and a plurality of (e.g., two) branch conduits 206b (e.g., radial conduits, bores, or branches) that are in fluidic communication with and extend radially outward from the central conduit 206a. The central conduit 206a is in fluidic communication with an oil source (not labeled) for receiving oil therefrom. The primary output shaft 206 additionally includes a peripheral channel 206d (e.g., circumferential or outer channel) that extends circumferentially around the primary output shaft 206. The peripheral channel 206d forms a recess in the outer periphery 206c of the primary output shaft 206 and distributes oil received from the branch conduits 206b entirely around the primary output shaft 206. For example, the primary output shaft 206 may include two branch conduits 206b that are spaced 180 degrees apart (e.g., as a single bore extending radially through the primary output shaft 206). The primary output shaft 206 and/or the central conduit 206a, the branch conduits 206b, and/or the peripheral channel 206d may also be considered part of the lubrication system. The oil source may also be considered part of the lubrication system.

Each valve 275 is configured to receive oil from the peripheral channel 206d of the primary output shaft 206 and selectively release the oil into the clutch housing 262 of the clutch 260. The valves 275 are positioned at circumferential locations about the hub 272. For example, the hub 272 may include four valves 275 positioned at quarter turns about the hub 272. Equal or even circumferential spacing of the valves 275 allows for rotational balance of the hub 272.

Each valve 275 is configured as a spool valve. The valve 275 includes a valve body, which is formed by the hub 272, and a valve rod 278. For each valve 275, the hub 272 includes a bore 276 (e.g., cylinder) that extends in an axial direction through the hub 272. The valve rod (e.g., moving or sliding valve member or piston) slides axially within the bore 276. More particularly, the valve rod 278 moves between a closed position (e.g., first or axially forward position; see FIG. 6A) to prevent oil from flowing through the valve 275 into the cavity 262a of the clutch housing 262, an open position (e.g., second or axially rearward position; see FIG. 6C) to allow oil to flow through the valve 275 into the cavity 262a of the clutch housing 262, as well as intermediate positions therebetween in which the valve 275 is fully open (see FIG. 6B).

The bore 276 includes one or more inlets 276b (e.g., inlet ports; e.g., three as shown), and one or more outlets 276d (e.g., outlet port; e.g., three as shown). The inlets 276b are formed as bores that extend in a radial direction from the inner periphery 272b of the hub 272 to the bore 276, while the outlets 276d are formed as bores that are aligned with the inlets 276b and which extend in a radial direction from the bore 276 to the outer periphery 272a of the hub 272. Oil flows radially outward from the peripheral channel 206d of the primary output shaft 206 into the bore 276 of the hub 272 through the inlets 276b, into the bore 276, and out of the bore 276 through the one or more outlets 276d. According to other exemplary embodiments, the bore 276 may include fewer or more inlets 276b and/or bores 276c.

The inlets 276b and the outlets 276d may, as shown, be spaced axially relative to an axis of the bore 276. For example, the inlets 276b and the outlets 276d may be positioned at different axial positions (e.g., distances) relative to the peripheral channel 206d of the primary output shaft 206. To help distribute oil in an axial direction from the peripheral channel 206d of the primary output shaft 206, the hub 272 may not include inner splines 272d at the circumferential position corresponding to the inlets 276b and the outlets 276d (see FIG. 5). The splines of the primary output shaft 206, thereby, define radially therebetween one or more axially extending channels 272e (e.g., axial channels) therebetween. The axial channels 272e are in fluidic communication with the branch conduits 206b, which are not blocked by inner splines 272d of the hub 272 and allow oil to pass from the peripheral channel 206d of the primary output shaft 206 in axial directions to the inlets 276b axially offset from the peripheral channel 206d. That is, the axial channels 272e allow the inlets 276b of the bore 276 to be in fluidic communication with each other external to the bore 276.

The valve rod 278 is configured to slide within the bore 276 of the hub 272 to selectively release or supply oil into the clutch housing 262. The valve rod 278 is a substantially cylindrical, elongated member that includes a forward end 278a, a rearward end 278b, one or more grooves 278c (e.g., three as shown), and two or more lands 278d (e.g., four as shown) on either side of and between the grooves 278c. The grooves 278c extend around the outer periphery of the valve rod 278 to provide a flow path between the lands 278d in a radial direction out of the bore 276. The forward end 278a of the valve rod 278 is configured to be engaged by the apply plate 268, and the rearward end 278b is engaged by a return spring 278e. The apply plate 268 and the return spring 278e move the valve rod 278 between open and closed positions. The rearward end 278b of the valve rod 278 is configured as a recess that receives therein the return spring 278e, which bears against the bearing member 264a of the base 264 of the clutch housing 262. Alternatively, a wear member (not shown) may be positioned in the bore 276 between the return spring 278e and the bearing member 264a to account for wear that may occur with the hub 272 and, thereby, the spring 278e rotating with the primary output shaft 206 independent of the base 264 of the housing 262 of the clutch 260. According to other exemplary embodiments, the valve rod 278 may include fewer or more grooves 278c to correspond to the number of inlets 276b and outlets 276c of the bore 276 in the hub 272.

The springs 278e of the plurality of valves 275 cooperatively function as return springs that, by way of the valve rods 278, move the apply plate 268 back to its disengaged position (see FIG. 4A) out of contact with the interleaved plates 270. The springs 278e may remain compressed between the valve rod 278 and the bearing member 264a of the clutch housing 262 over the entire range of travel of the apply plate 268, so as to press the valve rods 278 against the apply plate 268 and the apply plate 268 against the actuator system 361 (or bearing therebetween) to prevent unintended freeplay or axial movement thereof. Similarly, the valve rod 278 is compressed between the return spring 278e associated therewith and the apply plate 268, for example, through a range of travel of the apply plate 268 (e.g., between the disengaged or first position and the engaged or second position).

As shown in FIG. 6A, when in the closed position (i.e., forwardmost or first position), the forward end 278a of the valve rod 278 protrudes out of (e.g., forward from) the bore 276 and forward of a forwardmost axial end of the hub 272, and the lands 278d are aligned with the inlets 276b and the outlets 276d of the bore 276 of the hub 272 to prevent oil flow. As shown in FIG. 6C, when in the open position (i.e., rearmost or second position), the forward end 278a of the valve rod 278 is biased rearward by the apply plate 268, and the grooves 278c are instead aligned with the inlets 276b and the outlets 276d of the bore 276 of the hub 272 to allow oil flow.

The valves 275 may also be configured to be opened and/or achieve full or maximum flow prior to or simultaneous with the apply plate 268 engaging the interleaved plates 270. Thereafter, the valves 275 may maintain maximum flow or be fully open while the interleaved plates 270 are compressed toward each other and while the interleaved plates 270 are fully compressed. More particularly, and with reference to FIGS. 6A-6C, during an initial range of travel $T_1$, the apply plate 268 is moved from its disengaged position (see FIG. 6A) to an initially engaged position (see FIG. 6B) during which the interleaved plates 270 are first engaged by the apply plate 268 and the valves 275 are opened. During a subsequent range of travel $T_2$, the apply plate 268 is moved from its initially engaged position to a fully engaged position (see FIG. 6C) to compress the interleaved plates 270 and the valves 275 remain opened.

In the disengaged position (shown in FIG. 6A), the apply plate 268 is displaced axially away from a first of the interleaved plates 270 (e.g., by 1-2 mm) but is engaged with the forward end 278a of the valve rod 278. The lands 278d of the valve rod 278 are aligned with the inlets 276b and the outlets 276d of the bore 276 of the hub 272 so as to close the valve 275 and prevent oil flow.

In the initial engagement position (shown in FIG. 6B), the apply plate 268 first engages the end (e.g., forwardmost) of the interleaved plates 270. Instead of the lands 278d of the valve rod 278, the grooves 278c of the valve rod 278 are aligned with the inlets 276b and the outlets 276d of the bore 276 of the hub 272 so as to open the valve 275 and allow oil flow. More particularly, outer edges (i.e., forward and rearward edges) of the grooves 278c are between outer edges (i.e., forward and rearward edges) of the inlets 276b and/or the outlets 276d of the bore 276, such that the valves 275 are fully open when the apply plate 268 is in the initial engagement position.

To move the valves 275 from being fully closed to fully open over the initial range of travel $T_1$, the first range of travel $T_1$, a width $W_G$ of the grooves 278c of the valve rod 278, and a size $W_I$ of the inlets 276b (e.g., diameter) of the bore 276 in the hub 272 are cooperatively configured. In particular, the initial range of travel $T_1$ is greater than or equal to the width $W_G$ of the grooves 278c (i.e., $T_1 >= W_G$), while the size $W_{I/O}$ of the inlets 276b is greater than or equal to the width $W_G$ of the grooves 278c. As noted below, the size $W_{I/O}$ of the inlets 276b and/or outlets 276d can also be greater than the width $W_G$ to ensure the valves 275 are fully open over the second range of travel $T_2$ during which the interleaved plates 270 are engaged and then fully compressed.

In the fully engaged position (shown in FIG. 6C), the apply plate 268 maximally compresses the interleaved plates 270 together (e.g., between the apply plate 268 and the base 264 of the clutch housing 262). The grooves 278c of the valve rod 278 remain aligned with the inlets 276b and the outlets 276d of the bore 276 of the hub 272, so as to keep the valves 275 open and continue to allow oil to flow therethrough. More particularly, the outer edges of the grooves 278c remain between the outer edges of the inlets 276b and the outlets 276d of the bore 276, such that the valves 275 remain fully open when the apply plate 268 is in the fully engaged position and while the apply plate 268 is moved from the initial engagement position to the fully engaged position.

To keep the valves 275 fully open over the second range of travel $T_2$, the first range of travel $T_1$, a width $W_G$ (e.g., axial length) of the grooves 278b of the valve rod 278, and a size $W_{I/O}$ of the inlets 276b (e.g., axial distance or diameter) and/or outlets 276d of the bore 276 in the hub 272 are cooperatively configured. In particular, the width $W_{I/O}$ of the inlets 276b and/or outlets 276d is greater than or equal to the width $W_G$ of the grooves 278b by a distance greater than or equal to the second range of travel $T_2$ (i.e., $W_{I/O} - W_G >= T_2$). The width $W_{I/O}$ of the inlets 276b and/or outlets 276d is also greater than the second range of travel $T_2$. The range of travel $T_2$ may also be referred to as a compression distance of the interleaved plates 270.

To return the valves 275 to their fully closed positions and the apply plate 268 to its fully disengaged position, the ball cam mechanism 370 is rotated in an opposite direction, thereby allowing the springs 278e to bias the valve rods 278 and, thereby, the apply plate 268 forward.

While the disclosure has been made in connection with what is presently considered to be the most practical and preferred embodiment, it should be understood that the disclosure is intended to cover various modifications and equivalent arrangements.

The invention claimed is:
1. A transfer case comprising:
a primary output shaft having a hub rotationally coupled thereto;
a secondary output shaft;
a clutch configured to selectively couple the primary output shaft to the secondary output shaft to transfer torque therebetween, the clutch comprising:
a housing rotationally coupled to the secondary output shaft;
a plurality of interleaved plates that alternate between a first subset of the interleaved plates that are rota- tionally coupled to the hub and a second subset of the interleaved plates that are rotationally coupled to the housing; and an apply plate configured to compress the plurality of interleaved plates for transferring torque between the hub and the housing; and a plurality of valves configured to selectively release oil supplied through the primary output shaft into the housing, each valve having a bore formed in the hub and a valve rod movable by the apply plate to open the valve, wherein each valve is a spool valve.

2. The transfer case according to claim 1, wherein each bore extends parallel with an axis of the primary output shaft.

3. The transfer case according to claim 2, wherein the valves are circumferentially spaced evenly about the axis of the primary output shaft.

4. The transfer case according to claim 2, wherein each bore includes a plurality of inlets that are spaced axially along an axis of the bore.

5. The transfer case according to claim 4, wherein for each bore, the plurality of inlets are in fluidic communication with each other external to the bore.

6. The transfer case according to claim 5, wherein the hub has an inner periphery that defines a plurality of axial channels, and each axial channel is associated with one of the bores and places the plurality of inlets of the bore in fluidic communication with each other.

7. The transfer case according to claim 6, wherein the primary output shaft includes one or more radial conduits through which oil is communicated to the valves, and the plurality of axial channels are in fluidic communication with the one or more radial conduits.

8. The transfer case according to claim 7, wherein the primary output shaft includes a central conduit, two radial conduits in fluidic communication with the central conduit, and a peripheral channel in fluidic communication with the two radial conduits, and the plurality of axial channels of the hub are in fluidic communication with the peripheral channel of the primary output shaft.

9. A transfer case comprising:
a primary output shaft having a hub rotationally coupled thereto;
a secondary output shaft;
a clutch configured to selectively couple the primary output shaft to the secondary output shaft to transfer torque therebetween, the clutch comprising:
a housing rotationally coupled to the secondary output shaft;
a plurality of interleaved plates that alternate between a first subset of the interleaved plates that are rotationally coupled to the hub and a second subset of the interleaved plates that are rotationally coupled to the housing; and
an apply plate configured to compress the plurality of interleaved plates for transferring torque between the hub and the housing; and
a plurality of valves configured to selectively release oil supplied through the primary output shaft into the housing, each valve having a bore formed in the hub and a valve rod movable by the apply plate to open the valve, wherein each valve rod is movable in an axial direction parallel with an axis of the primary output shaft to open the valve for oil to flow through the valve in a radial direction.

10. The transfer case according to claim 9, wherein each bore includes a plurality of inlets in an inner periphery of the hub and a plurality of outlets in an outer periphery of the hub, each inlet being aligned with one of the outlets; and
wherein each valve rod includes a plurality of grooves, each groove being movable into simultaneous alignment with one of the inlets and one of the outlets to open the valve.

11. The transfer case according to claim 10, wherein each groove is arranged circumferentially around the valve rod, has an axial length, and is associated with one of the inlets, and each inlet has an axial length that is greater than a compression distance of the interleaved plates.

12. The transfer case according to claim 11, wherein the axial length of the inlet is greater than or equal to a sum of the axial length of the groove associated therewith and the compression distance.

13. A transfer case comprising:
a primary output shaft having a hub rotationally coupled thereto;
a secondary output shaft;
a clutch configured to selectively couple the primary output shaft to the secondary output shaft to transfer torque therebetween, the clutch comprising:
a housing rotationally coupled to the secondary output shaft;
a plurality of interleaved plates that alternate between a first subset of the interleaved plates that are rotationally coupled to the hub and a second subset of the interleaved plates that are rotationally coupled to the housing; and
an apply plate configured to compress the plurality of interleaved plates for transferring torque between the hub and the housing;
a plurality of valves configured to selectively release oil supplied through the primary output shaft into the housing, each valve having a bore formed in the hub and a valve rod movable by the apply plate to open the valve; and
return springs that are each associated with one of the valves and compress the valve rod of the valve associated therewith against the apply plate.

14. The transfer case according to claim 13, wherein the apply plate is moved axially between a first position in which the interleaved plates are not compressed and a second position in which the interleaved plates are compressed, and the return springs move the apply plate to the first position.

15. A transfer case comprising:
a primary output shaft having a hub rotationally coupled thereto;
a secondary output shaft;
a torque transfer mechanism for selectively transferring torque between the primary output shaft and the secondary output shaft;
a lubrication system for lubricating the torque transfer mechanism, wherein the lubrication system includes a plurality of valves configured to selectively release oil supplied through the primary output shaft into the torque transfer mechanism, each valve having a bore formed in the hub and a valve rod movable by the torque transfer mechanism to open the valve, each bore extending parallel to an axis of the primary output shaft and including a plurality of inlets that are spaced axially along an axis of the bore; and
an actuation system, wherein the actuation system simultaneously operates the torque transfer mechanism and the lubrication system.

16. The transfer case according to claim 15, wherein the torque transfer mechanism includes a clutch and the actuation system opens the valves by operating the clutch.

17. The transfer case according to claim 16, wherein the valves are opened by the clutch prior to the clutch transferring torque between the primary output shaft and the secondary output shaft.

18. The transfer case according to claim 17, further including a housing rotationally coupled to the secondary output shaft, the clutch including:
- a plurality of interleaved plates that alternate between a first subset of the interleaved plates that are rotationally coupled to the hub and a second subset of the interleaved plates that are rotationally coupled to the housing; and
- an apply plate configured to compress the plurality of interleaved plates for transferring torque between the hub and the housing,
- wherein the valve rods are movable by the apply plate to open the valves.

* * * * *